(12) United States Patent
Kim et al.

(10) Patent No.: US 12,405,676 B2
(45) Date of Patent: Sep. 2, 2025

(54) WEARABLE DEVICE, SENSING INFORMATION-BASED INPUT CONTROL METHOD OF WEARABLE DEVICE, AND RECORDING MEDIUM

(71) Applicant: Samsung Electronics Co., Ltd., Suwon-si (KR)

(72) Inventors: Jinik Kim, Suwon-si (KR); Namjoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/632,556

(22) Filed: Apr. 11, 2024

(65) Prior Publication Data

US 2025/0028398 A1    Jan. 23, 2025

Related U.S. Application Data

(63) Continuation of application No. PCT/KR2024/004248, filed on Apr. 2, 2024.

(30) Foreign Application Priority Data

Jul. 20, 2023 (KR) .................. 10-2023-0094784
Jul. 25, 2023 (KR) .................. 10-2023-0097040

(51) Int. Cl.
*G06F 3/0346* (2013.01)
*G04G 21/02* (2010.01)
(Continued)

(52) U.S. Cl.
CPC ........... *G06F 3/0346* (2013.01); *G04G 21/02* (2013.01); *G06F 3/011* (2013.01); *G06F 3/0362* (2013.01);
(Continued)

(58) Field of Classification Search
CPC ...... G06F 3/0346; G06F 3/011; G06F 3/0362; G06F 3/038; G06F 3/02; G06F 3/041; G04G 21/02
See application file for complete search history.

(56) References Cited

U.S. PATENT DOCUMENTS 10,025,399 B2   7/2018   Kim et al.
10,275,143 B2   4/2019   Nagaraju et al.
(Continued)

FOREIGN PATENT DOCUMENTS

KR   10-2015-0010087 A   1/2015
KR   10-2015-0122062 A   10/2015
(Continued)

OTHER PUBLICATIONS

International Search Report dated Jul. 9, 2024, issued in International Application No. PCT/KR2024/004248.

*Primary Examiner* — Jonathan A Boyd
(74) *Attorney, Agent, or Firm* — Jefferson IP Law, LLP

(57) ABSTRACT

A wearable device, a sensing information-based input control method of a wearable device, and a recording medium are provided. A wearable device includes an input interface, a first sensor, a second sensor, a display, and at least one processor configured to identify a direction and an angle in which the display faces, determine that the direction in which the display faces corresponds to an outside of a field-of-view range of a user when the identified direction and angle is outside a pre-configured range, configure an input determination threshold value of the input interface to be changed from a configured first threshold value to a second threshold value when determining that the direction in which the display faces corresponds to an outside of the field-of-view range of the user, and perform an operation corresponding to an input when a value greater than the (Continued)

input determination threshold value is input through the input interface.

18 Claims, 20 Drawing Sheets

(51) Int. Cl.
    *G06F 3/01*         (2006.01)
    *G06F 3/0362*     (2013.01)
    *G06F 3/038*      (2013.01)
    G06F 3/02        (2006.01)
    G06F 3/041      (2006.01)

(52) U.S. Cl.
    CPC ............... *G06F 3/038* (2013.01); *G06F 3/02* (2013.01); *G06F 3/041* (2013.01)

(56) References Cited

U.S. PATENT DOCUMENTS

| | | | |
|---|---|---|---|
| 10,606,374 | B2 | 3/2020 | Park et al. |
| 10,616,762 | B2* | 4/2020 | Kang .................... G06F 1/3287 |
| 10,969,866 | B1 | 4/2021 | Ely et al. |
| 11,347,351 | B2 | 5/2022 | Shedletsky et al. |
| 2009/0244030 | A1* | 10/2009 | Kimura ................. G06F 3/0418 345/173 |
| 2012/0319959 | A1* | 12/2012 | Saponas .............. G06F 3/04886 345/173 |
| 2014/0204045 | A1* | 7/2014 | Komoto ........... H04W 52/0267 345/173 |
| 2015/0091824 | A1* | 4/2015 | Hori ...................... G06F 3/0346 345/173 |
| 2015/0092520 | A1 | 4/2015 | Robison et al. |
| 2015/0160622 | A1* | 6/2015 | Kim ....................... G04G 21/02 368/9 |
| 2015/0338926 | A1* | 11/2015 | Park ........................ G06F 3/005 345/156 |
| 2016/0360488 | A1* | 12/2016 | Kapoor ............. H04W 52/0264 |
| 2017/0090623 | A1* | 3/2017 | Masaki ............... G06F 3/04883 |
| 2018/0160977 | A1* | 6/2018 | Meere .................... A61B 5/224 |
| 2018/0232063 | A1* | 8/2018 | Park ....................... A61B 5/7475 |
| 2019/0114005 | A1* | 4/2019 | Kies ........................ G06F 3/041 |
| 2020/0192547 | A1* | 6/2020 | Kim ....................... G06F 1/1677 |

FOREIGN PATENT DOCUMENTS

| | | |
|---|---|---|
| KR | 10-2017-0022145 A | 3/2017 |
| KR | 10-1725483 B1 | 4/2017 |
| KR | 10-2143474 B1 | 8/2020 |
| KR | 10-2023-0023230 A | 2/2023 |

* cited by examiner

WEARABLE DEVICE, SENSING INFORMATION-BASED INPUT CONTROL METHOD OF WEARABLE DEVICE, AND RECORDING MEDIUM

CROSS-REFERENCE TO RELATED APPLICATION(S)

This application is a continuation application, claiming priority under § 365(c), of an International application No. PCT/KR2024/004248, filed on Apr. 2, 2024, which is based on and claims the benefit of a Korean patent application number 10-2023-0094784, filed on Jul. 20, 2023, in the Korean Intellectual Property Office, and of a Korean patent application number 10-2023-0097040, filed on Jul. 25, 2023, in the Korean Intellectual Property Office, the disclosure of each of which is incorporated by reference herein in its entirety.

TECHNICAL FIELD

The disclosure relates to a wearable device and a control method. More particularly, the disclosure relates to a wearable device and a sensing information-based input control method of a wearable device.

BACKGROUND ART

Various terminal devices are commercialized. A wearable device is one of the various commercialized terminal devices. A wearable device may refer to a device wearable by a user. Wearing a wearable device enables a user to conveniently carry the device and to freely use both hands. A wearable device may include various sensors. Sensors included in a wearable device may detect a movement of the device or biometric data about the user. Further, a wearable device may include not only a touchscreen but also various input interfaces, and may receive a user command through various input interfaces.

The above information is presented as background information only to assist with an understanding of the disclosure. No determination has been made, and no assertion is made, as to whether any of the above might be applicable as prior art with regard to the disclosure.

DISCLOSURE OF INVENTION

Aspects of the disclosure are to address at least the above-mentioned problems and/or disadvantages and to provide at least the advantages described below. Accordingly, an aspect of the disclosure is to provide a wearable device, sensing and information-based input control method of wearable device, and recording medium.

Additional aspects will be set forth in part in the description which follows and, in part, will be apparent from the description, or may be learned by practice of the presented embodiments.

In accordance with an aspect of the disclosure, a wearable device is provided. The wearable device includes an input interface, a first sensor configured to detect wearing information about the wearable device, a second sensor configured to detect inertial information about the wearable device, a display, memory storing one or more computer programs, and one or more processors communicatively coupled to the input interface, the first sensor, the second sensor, the display, and the memory. The one or more computer programs include computer-readable instructions that, when executed by the one or more processors, cause the wearable device to identify a direction in which and an angle by which the display faces, based on the inertial information detected by the second sensor when the wearing information about the wearable device is detected by the first sensor, determine that the direction in which the display faces corresponds to an outside of a field-of-view range of a user when the identified direction and angle is outside a pre-configured range, configure an input determination threshold value of the input interface to be changed from a configured first threshold value to a second threshold value greater than the first threshold value when determining that the direction in which the display faces corresponds to an outside of the field-of-view range of the user, and perform an operation corresponding to an input when a value greater than the input determination threshold value is input through the input interface.

In accordance with another aspect of the disclosure, a sensing information-based input control method of a wearable device is provided. The method includes identifying a direction in which and an angle by which a display faces, based on inertial information detected by a second sensor when wearing information about the wearable device is detected by a first sensor, determining that the direction in which the display faces corresponds to an outside of a field-of-view range of a user when the identified direction and angle is outside a pre-configured range, configuring an input determination threshold value of an input interface to be changed from a configured first threshold value to a second threshold value greater than the first threshold value when determining that the direction in which the display faces corresponds to an outside of the field-of-view range of the user, and performing an operation corresponding to an input when a value greater than the input determination threshold value is input.

In accordance with another aspect of the disclosure, one or more non-transitory computer-readable recording media storing one or more computer programs including computer-executable instructions that, when executed by one or more processors of a wearable device, cause the wearable device to perform operations are provided. The operations include identifying a direction in which and an angle by which a display faces, based on inertial information detected by a second sensor when wearing information about the wearable device is detected by a first sensor, determining that the direction in which the display faces corresponds to an outside of a field-of-view range of a user when the identified direction and angle is outside a pre-configured range, configuring an input determination threshold value of an input interface to be changed from a configured first threshold value to a second threshold value greater than the first threshold value when determining that the direction in which the display faces corresponds to an outside of the field-of-view range of the user, and performing an operation corresponding to an input when a value greater than the input determination threshold value is input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the drawings accompanying is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
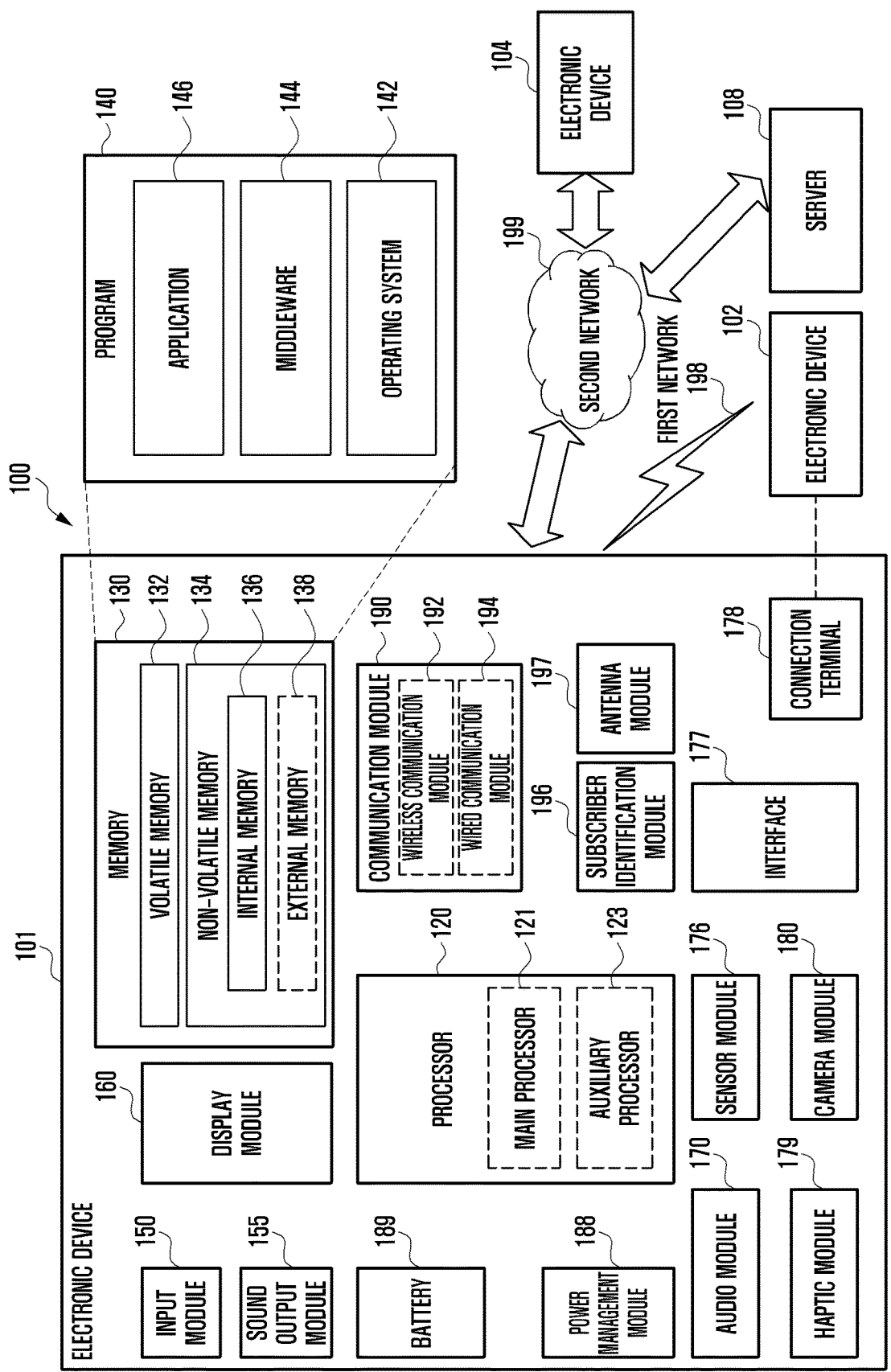
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
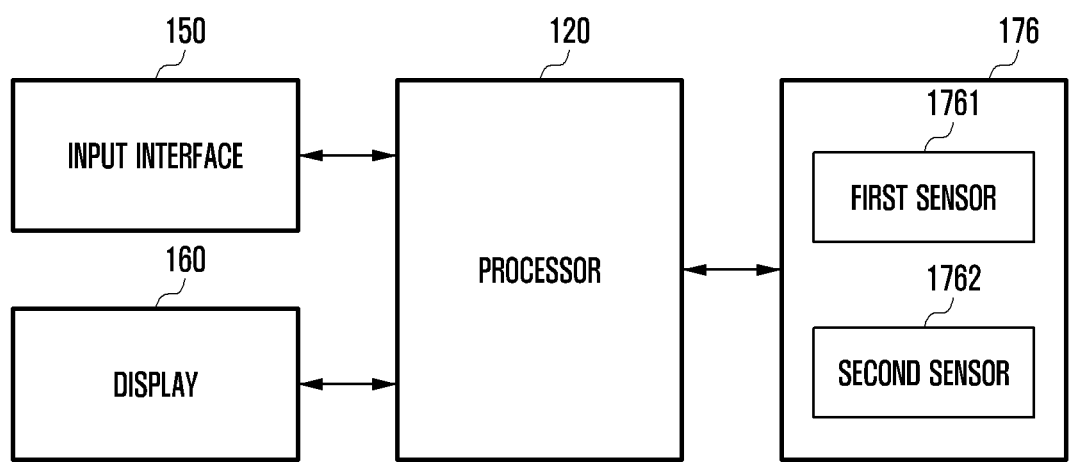
FIG. 2 is a block diagram illustrating a configuration of a wearable device according to an embodiment of the disclosure.

FIG. 2 is a block diagram illustrating a configuration of a wearable device in a network environment according to an embodiment of the disclosure.

Referring to FIG. 2, the wearable device 101 may include an input interface 150, a display 160, a sensor 176, and a processor 120.

The input interface 150 (e.g., the input module 150 of FIG. 1) may receive a control command from a user. For example, the input interface 150 may include a bezel, a stem (or crown), a button, a jog dial, and/or a touchscreen. In one example, when the input interface 150 is a bezel, a stem, and/or a jog dial, the processor 120 may perform an operation based on a signal according to rotation of the input interface 150. Alternatively, when the input interface 150 is a button and/or a touchscreen, the input interface 150 may perform an operation based on a signal according to touch and/or press of the input interface 150. The input interface 150 may receive information related to a wearing position of the wearable device 101 (e.g., the electronic device 101 of FIG. 1) from a user. For example, the information related to the wearing position of the wearable device 101 may be information about whether the wearable device 101 is worn on the user's left or right arm. The processor 120 may determine an axis of a second sensor 1762, based on the information related to the wearing. The input interface 150 may be referred to as an input device, an input unit, an input module, and the like.

The display 160 (e.g., the display module 160 in FIG. 1) may output data processed by the processor 120 as an image. For example, the display 160 may output a user interface (UI) corresponding to a user input, or may change a displayed UI to another UI. Alternatively, the display 160 may display an application that is executed according to a user input. For example, the display 160 may be configured as a liquid crystal display (LCD), an organic light-emitting diode (OLED) display, and/or a touchscreen. When the display 160 is configured as a touchscreen, the wearable device 101 may receive a control command through the touchscreen.

The sensor 176 (e.g., the sensor module 176 in FIG. 1) may include a first sensor 1761 and the second sensor 1762. The first sensor 1761 may detect whether the user is wearing the wearable device. For example, the first sensor 1761 may be a wearing detection sensor, and may include a photoplethysmogram (PPG) sensor, an electrocardiogram (ECG) sensor, an electrodermal activity sensor, and/or an $SpO_2$ sensor. The second sensor 1762 may detect inertial information about the wearable device 101. For example, the second sensor 1762 may be an inertial sensor, and may include an acceleration sensor, a gravity sensor, a gyro sensor, and/or a geomagnetic sensor.

The processor 120 (e.g., the processor 120 in FIG. 1) may control each component of the wearable device 101. The wearable device 101 may include one or more processors 120.

The processor 120 may determine whether the wearable device 101 is worn, based on a signal (e.g., wearing information) detected by the first sensor 1761. When determining that the user is wearing the wearable device 101, the processor 120 may determine whether a direction of the display 160 of the wearable device 101 corresponds to an inside or outside a field-of-view range of the user.

The processor 120 may identify a direction in which and an angle by which the display 160 faces, based on a signal (e.g., inertial information) detected by the second sensor 1762. Since the wearable device 101 is worn on a body part of the user, the inertial information detected according to a movement of the user may include noise. Therefore, the processor 120 may perform a preprocessing process of subjecting the detected inertial information to low-pass filtering. The processor 120 may determine a wearing position of the wearable device 101 according to an input from the user. The processor 120 may determine the axis of the second sensor 1762, based on the determined wearing position. For example, when the user wears the wearable device 101 on the left arm, the processor 120 may determine the axis of the second sensor 1762 as an initially configured axis. Alternatively, when the user wears the wearable device 101 on the right arm, the processor 120 may determine the axis of the second sensor 1762 to be axisymmetric to the initially configured axis with respect to the user. The second sensor 1762 may detect the inertial information of the second sensor 1762 based on the determined axis. The processor 120 may determine information about a vertical angle and size of the display 160 (or the wearable device 101), based on the determined axis of the second sensor 1762 and the inertial information, thereby identifying the direction in which and the angle by which the display 160 faces. For example, the processor 120 may determine that one horizontal axis is inclined by 45 degrees, based on the inertial information detected based on the axis of the second sensor 1762. Alternatively, the processor 120 may determine that one horizontal axis is inclined by −30 degrees.

When the identified direction and angle escape from a pre-configured range, the processor 120 may determine that the direction in which the display 160 faces corresponds to an outside of the field-of-view range of the user. For example, the pre-configured range may be configured such that one horizontal axis has an inclination ranging from −60 degrees to 0 degrees. The pre-configured range may be the field-of-view range of the user. When the direction in which the display 160 faces corresponds to an inside of the pre-configured range, the display 160 may correspond to an inside of the field-of-view range of the user. When the direction in which the display 160 faces corresponds to an outside of the pre-configured range, the display 160 may correspond to an outside of the field-of-view range of the user. In one example, when one horizontal axis of the detected inertial information is inclined by 45 degrees, the detected inertial information may correspond to an outside of the pre-configured range. Accordingly, the processor 120 may determine that the direction in which the display 160 faces corresponds to an outside of the field-of-view range of the user. When one horizontal axis of the detected inertial information is inclined by −30 degrees, the detected inertial information may correspond to an inside of the pre-configured range. Accordingly, the processor 120 may determine that the direction in which the display 160 faces corresponds to an inside of the field-of-view range of the user.

When determining that the direction of the display 160 corresponds to an outside of the field-of-view range of the user, the processor 120 may change an input determination threshold value of the input interface 150 from a configured first threshold value to a second threshold value. The input determination threshold value may be a minimum value related to an input that the processor 120 determines as a normal input. The second threshold value may be a value greater than the first threshold value.

For example, the input interface 150 may include a bezel, a stem, and/or a jog dial. In this case, the input determination threshold value may be an angle. Therefore, the first threshold value is a pre-configured first angle, and the second threshold value may be a pre-configured second angle. For example, the first threshold value may be 30 degrees, and the second threshold may be 45 degrees. When the input determination threshold value is the first threshold (e.g., 30 degrees) and the input interface 150 is rotated by 30 degrees or more, the processor 120 may determine that a user command is input, and may perform an operation corresponding to the input command. When determining that the direction of the display 160 corresponds to an outside of the field-of-view range of the user, the processor 120 may change the input determination threshold value to the second threshold value (e.g., 45 degrees). When the input determination threshold value is changed to the second threshold value, the input interface 150 may be rotated by 30 degrees. In this case, the processor 120 may determine that a normal command is not input from the user, and may ignore an input of rotating the input interface 150. Alternatively, the input interface 150 may be rotated by 45 degrees or more. In this case, the processor 120 may determine that a normal command is input from the user, and may perform an operation corresponding to an input of rotating the input interface 150.

Alternatively, the input interface 150 may include a button and/or a touchscreen. The button may be a physical button or a button in a form of a touch pad. In this case, the input determination threshold value is an input time, an input pressure, and/or the number of inputs. Accordingly, the first threshold value may be a pre-configured first input time, a pre-configured first input pressure, and/or a pre-configured first number of inputs, and the second threshold value may be a pre-configured second input time, a pre-configured second input pressure, and/or a pre-configured second number of inputs. When the input time, the input pressure, and/or the number of inputs input through the input interface 150 is greater than the configured input determination threshold value, the processor 120 may perform an operation corresponding to an input.

For example, the corresponding operation may include changing a mode of the wearable device 101 and/or changing a screen. The wearable device 101 may include various modes. For example, the various modes may include a low-power mode and a normal mode. The low-power mode may include mode a and mode b. For example, mode a may be a sleep mode. In mode a (e.g., the sleep mode), the processor 120 may supply only power related to at least an essential function, and may turn off power for other functions (e.g., turn off the display). Mode b is an always-on-display (AOD) mode. In mode b (e.g., the AOD mode), the processor 120 may drive the display with low power to display limited information on the display 160. The normal mode may be a wake-up mode. In the normal mode (e.g., the wake-up mode), the processor 120 may supply power related to all functions. In the normal mode, the processor 120 may normally supply power to the display 160, and thus all information may be displayed on the display 160.

The processor 120 may determine a state of the user lowering and/or moving an arm on which the wearable device 101 is worn, based on the detected inertial information. For example, when the vertical axis of the display 160 is horizontal and there is no movement (or almost no movement) of the wearable device 101, the processor 120 may determine that the user is in a state of lowering the arm on which the wearable device 101 is worn. Alternatively, the processor 120 may identify change information about a roll value and/or pitch value of the wearable device 101 from the detected inertial information. When the identified change information about the roll value and/or pitch value is a pre-configured period or more, the processor 120 may determine that the user is swinging the arm on which the wearable device 101 is worn. The user may not use the wearable device 101 in a state of the user lowering the arm on which the wearable device 101 is worn or swinging the arm. Therefore, the processor 120 may determine that the state of the user lowering the arm on which the wearable device 101 is worn or swinging the arm corresponds to an outside of the field-of-view range of the user. Accordingly, the processor 120 may change the input determination threshold value from the first threshold value to the second threshold value.

When the direction of the display 160 remains to correspond to an outside of the field-of-view range of the user after changing the input determination threshold value to the second threshold value, the processor 120 may maintain the input determination threshold value at the second threshold value regardless of a change in display mode. For example, after the input determination threshold value is changed to the second threshold value, the processor 120 may change the display mode from mode a to mode b according to an input equal to or greater than the second threshold value. Even though the display mode is changed, when the direction of the display 160 remains outside the field-of-view range of the user, the processor 120 may maintain the input determination threshold value at the second threshold value. Accordingly, when an input less than the second threshold value is received, the processor 120 may ignore the received input.

Figure 3A:
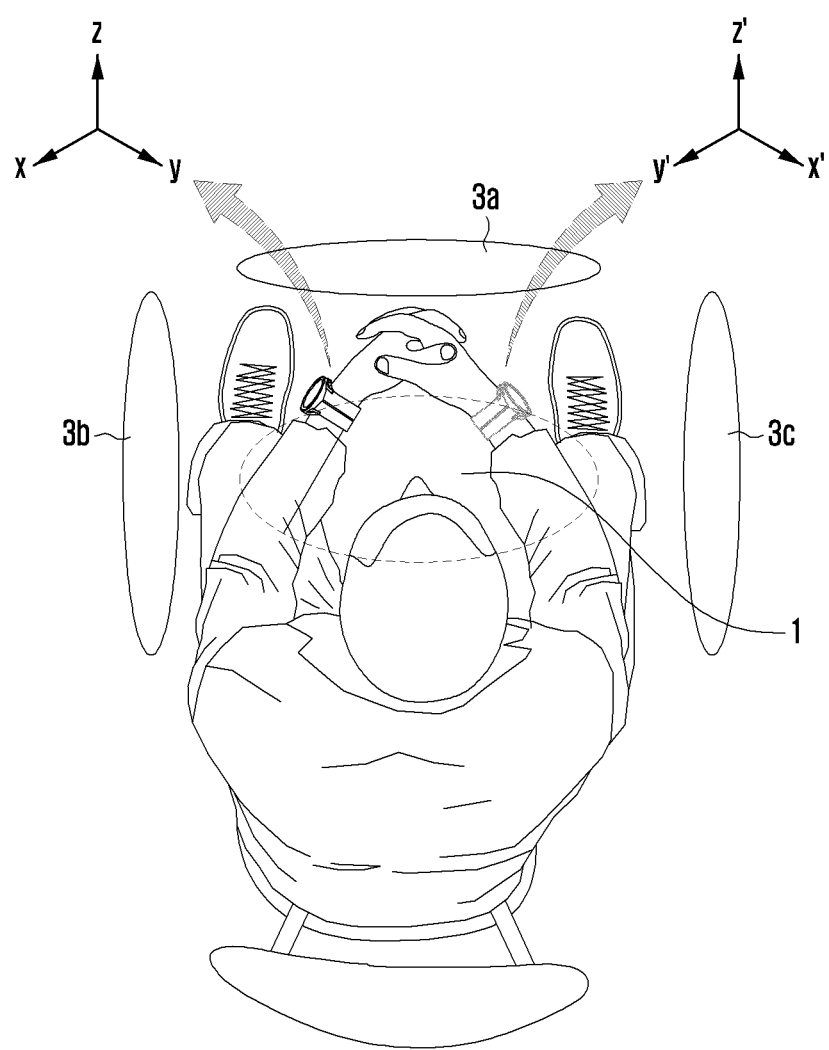
FIGS. 3A and 3B illustrate a relationship between a position of a wearable device and a gaze direction of a user according to various embodiments of the disclosure.
Figure 3B:
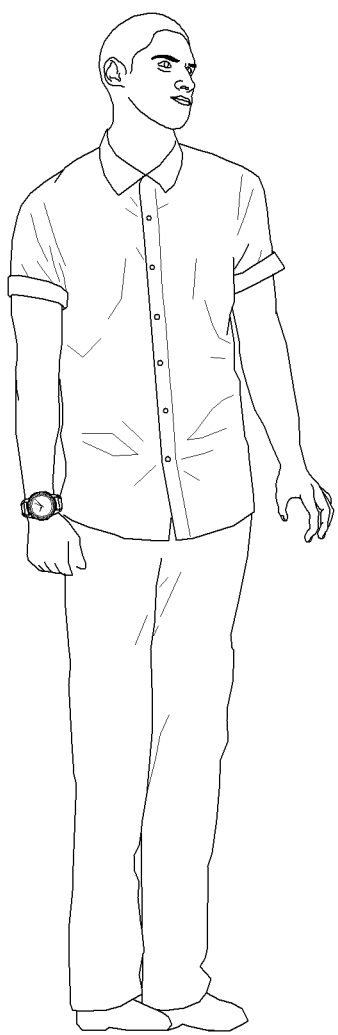

FIGS. 3A and 3B illustrate a relationship between a position of a wearable device and a gaze direction of a user according to various embodiments of the disclosure.

FIG. 3A shows a seated user that wears a wearable device 101. For example, when the wearable device 101 is worn on the user's left arm (or left hand), an upper direction of the user's arm may be an x-axis, a direction of the user's body may be a y-axis, and a vertical direction may be a z-axis. For example, in the wearable deice 101, when the x-axis is moved by −70 degrees in a horizontal direction and the y-axis is moved by −30 degrees in a vertical direction according to movement of the left arm, a display 160 may be directed toward a body area 1 of the user. When a direction of the display 160 is toward the body area 1 of the user, the wearable device 101 may determine that the direction of the display 160 corresponds to an inside of a field-of-view range of the user. In the wearable deice 101, when the x-axis is moved by −10 degrees in the horizontal direction and the y-axis is moved by 70 degrees in the vertical direction, the display 160 may be directed toward a front area 3a of the user. When the direction of the display 160 is toward the front area 3a of the user, the wearable device 101 may determine that the direction of the display 160 corresponds to an outside of the field-of-view range of the user. In addition, in the wearable deice 101, when the x-axis is moved by 30 degrees in the horizontal direction and the y-axis is moved by 50 degrees in the vertical direction, the display 160 may be directed toward a left area 3b of the user. When the direction of the display 160 is toward the left area 3b of the user, the wearable device 101 may determine that the direction of the display 160 corresponds to an outside of the field-of-view range of the user.

The wearable device 101 may be worn on the user's right arm (or right hand). The wearable device 101 may receive information about a position (e.g., left or right) on which the wearable device 101 is worn from the user. When the wearable device 101 receives a wearing position as the right arm from the user, the wearable device 101 may determine an axis of a second sensor (e.g., an inertial sensor). The wearable device 101 may move the axes where the wearable device 101 is worn on the left arm in an axisymmetric direction. For example, the wearable device 101 may move the axes such that the upper direction of the user's arm is an x'-axis, the direction of the user's body is a y'-axis, and the vertical direction is a z'-axis. For example, in the wearable deice 101, when the x'-axis is moved by −70 degrees in a horizontal direction and the y'-axis is moved by −30 degrees in a vertical direction according to movement of the left arm, a display 160 may be directed toward a body area 1 of the user. When a direction of the display 160 is toward the body area 1 of the user, the wearable device 101 may determine that the direction of the display 160 corresponds to an inside of the field-of-view range of the user. Further, in the wearable deice 101, when the x'-axis is moved by −10 degrees in the horizontal direction and the y'-axis is moved by 70 degrees in the vertical direction, the display 160 may be directed toward the front area 3a of the user. When the direction of the display 160 is toward the front area 3a of the user, the wearable device 101 may determine that the direction of the display 160 corresponds to an outside of the field-of-view range of the user. When the x'-axis is moved by 30 degrees in the horizontal direction and the y'-axis is moved by 50 degrees in the vertical direction, the display 160 may be directed toward a right area 3c of the user. When the direction of the display 160 is toward the right area 3c of the user, the wearable device 101 may determine that the direction of the display 160 corresponds to an outside of the field-of-view range of the user.

FIG. 3B shows the user lowering the arm on which the wearable device 101 is worn. For example, when the z-axis (or z'-axis) of the display 160 is horizontal. state and there is no movement (or almost no movement) of the wearable device 101 (or almost no movement), the wearable device 101 may determine that the user lowers the arm on which the wearable device 101 is worn. Further, the wearable device 101 may determine that the display 160 corresponds to an outside of the field-of-view range of the user.

When determining that the direction of the display 160 corresponds to an outside of the field-of-view range of the user, the wearable device 101 may change an input determination threshold value from a first threshold value to a second threshold value. The second threshold value may be greater than the first threshold value. When the wearable device 101 determines that the direction of the display 160 corresponds to an outside of the field-of-view range of the user, the wearable device 101 may operate by receiving an input of a greater threshold value. Accordingly, the wearable device 101 may prevent a malfunction due to an unintentional input by the user when the user does not watch (or not use) the wearable device 101.

Figure 4:
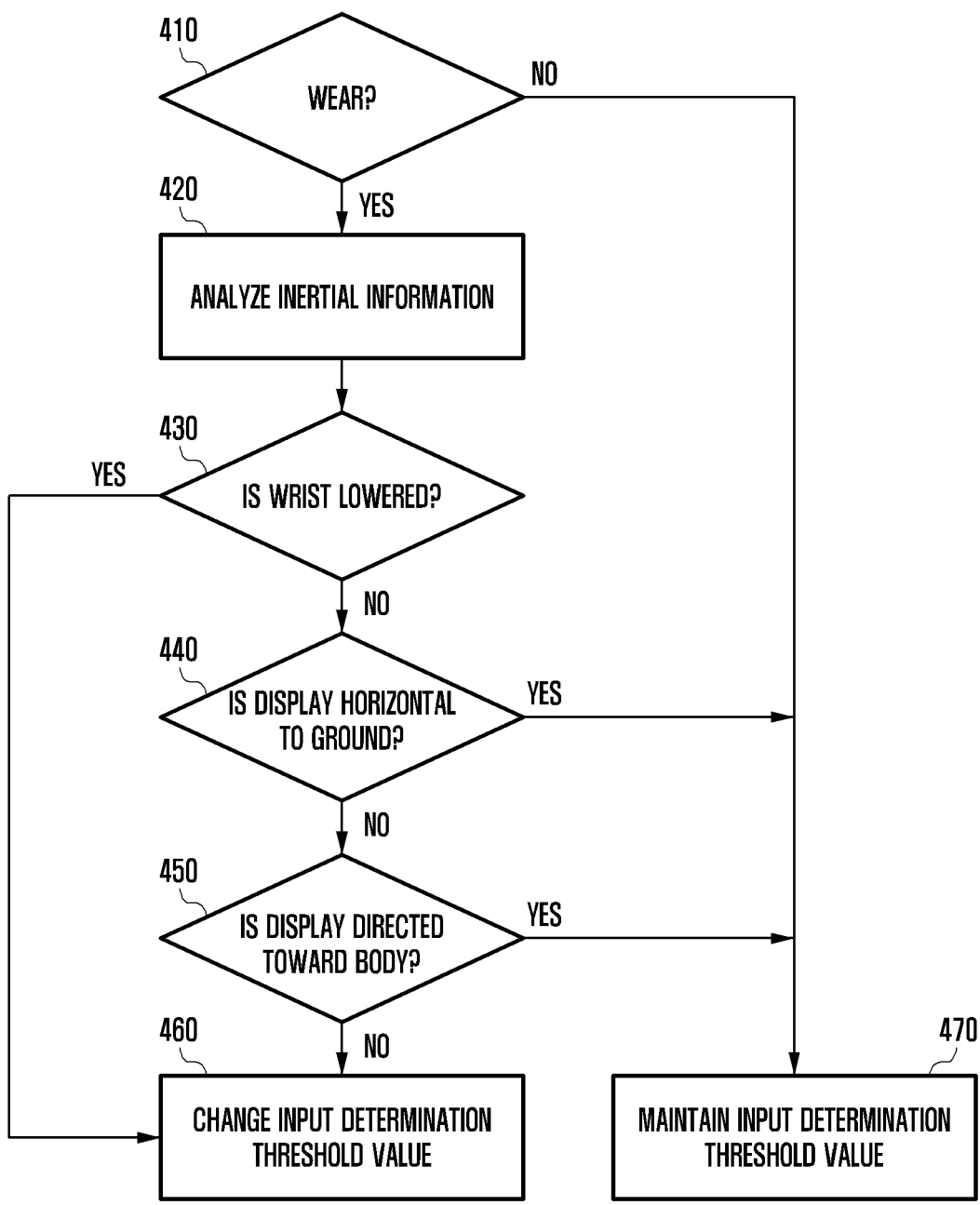
FIG. 4 is a flowchart illustrating a process of changing an input determination threshold value, based on a direction of a wearable device according to an embodiment of the disclosure.

FIG. 4 is a flowchart illustrating a process of changing an input determination threshold value, based on a direction of a wearable device according to an embodiment of the disclosure.

Referring to FIG. 4, operations may be performed sequentially, but are not necessarily performed sequentially. For example, the operations may be performed in a different order, and at least two operations may be performed in parallel.

Operation 410 to operation 470 may be understood as being performed by a processor (e.g., the processor 120 of FIG. 2) of a wearable device (e.g., the wearable device 101 of FIG. 2).

Referring to FIG. 4, the wearable device 101 may determine whether the wearable device 101 is worn in operation 410. For example, the wearable device 101 may determine whether the wearable device 101 is worn by using a first sensor (e.g., a wearing detection sensor) 1761. When determining that the wearable device 101 is not worn (410-N), the wearable device 101 may determine an input determination threshold value in operation 470. Generally, the wearable device 101 may configure a first threshold value as the input determination threshold value. Accordingly, the wearable device 101 may maintain the first threshold.

When determining that the wearable device 101 is worn operation 410-Y, the wearable device 101 may analyze inertial information in operation 420. The inertial information may include acceleration information, and may be obtained by using a second sensor (e.g., an inertial sensor) 1762. For example, the wearable device 101 may use equation 1 to analyze the inertial information.

$$\text{magnitude} = \sqrt{acc_x^2 + acc_y^2 + acc_z^2} \quad \text{Equation 1}$$

$$FOV = \arcsin(acc_z, \text{magnitude})$$

In Equation 1, magnitude may be a magnitude of acceleration, $acc_x$ may be x-axis acceleration, $acc_y$ may be y-axis acceleration, $acc_z$ may be z-axis acceleration, and field of view (FOV) may be a viewing angle.

The wearable device 101 may identify a viewing angle, and may determine whether a wrist is lowered in operation 430. When determining that the viewing angle of a display 160 (or the wearable device 101) is horizontal to the ground, the wearable device 101 may determine that the wrist is in a state of being lowered. When determining that the wrist is in the state of being lowered operation 430-Y, the wearable device 101 may change the input determination threshold value from a first threshold value to a second threshold value in operation 460.

When determining that the wrist is not in the state of being lowered in operation 430-N, the wearable device 101 may determine whether the display 160 is horizontal (almost horizontal) to the ground in operation 440. When the display 160 is horizontal to the ground in operation 440-Y, the wearable device 101 may maintain the input determination threshold value at the first threshold value. When the display 160 is not horizontal to the ground in operation 440-N, the wearable device 101 may determine whether the display 160 is in a direction toward a body in operation 450. The wearable device 101 may determine whether the display 160 is in the direction toward the body, based on the identified viewing angle. When the display 160 is not in the direction toward the body in operation 450-N, the wearable device 101 may change the input determination threshold value to the second threshold value in operation 460. When the display 160 is in the direction toward the body in operation 450-Y, the wearable device 101 may maintain the input determination threshold value at the first threshold value in operation 470.

Figure 5:
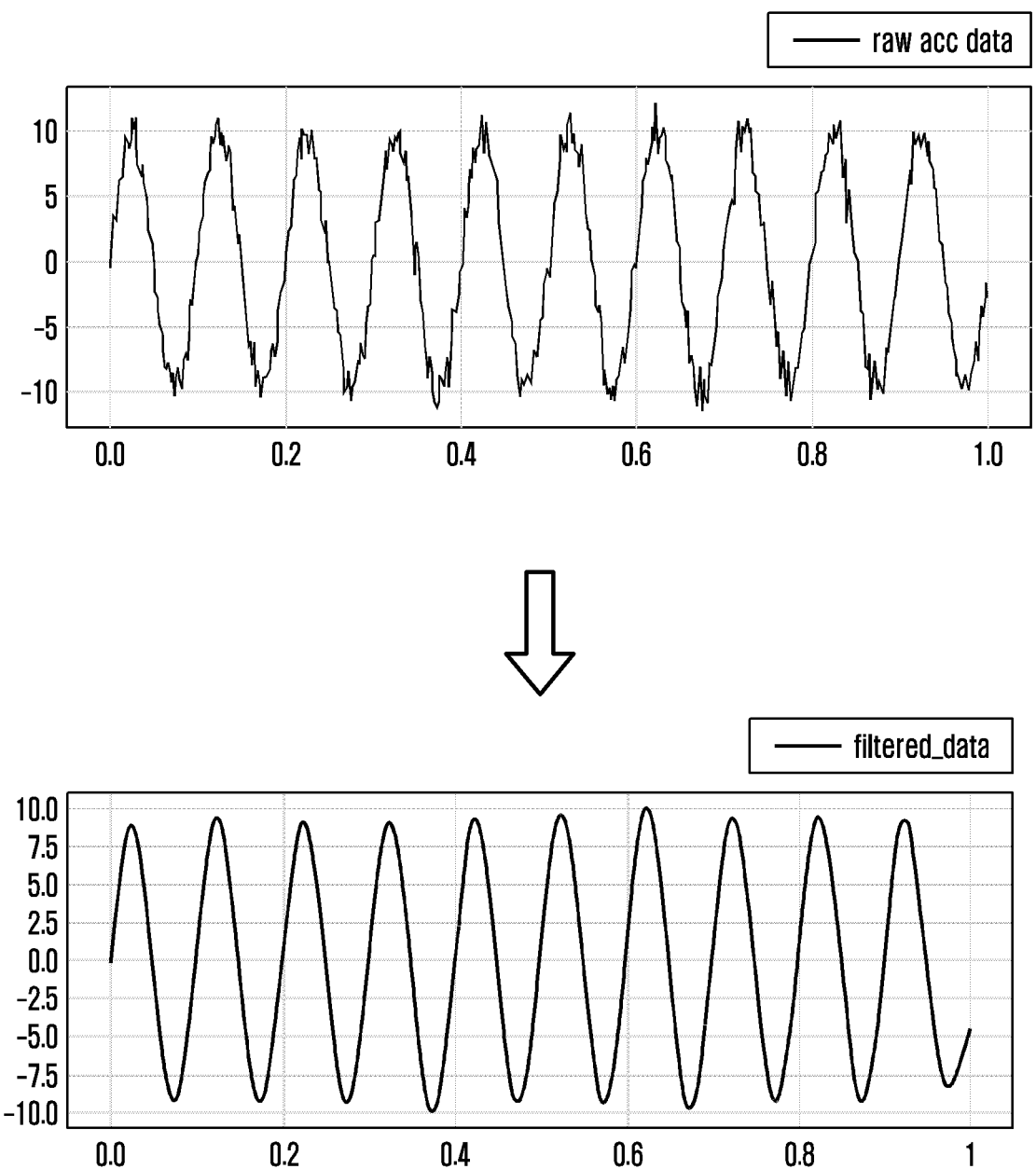
FIG. 5 illustrates a process of preprocessing sensing data according to an embodiment of the disclosure.

FIG. 5 illustrates a process of preprocessing sensing data according to an embodiment of the disclosure.

FIG. 5 shows a waveform of sensing data. Since a wearable device 101 is worn by a user, obtained inertial information may include noise. The wearable device 101 may preprocess the obtained inertial information by using a low-pass filter. The preprocessed inertial information may result from filtering-out of a high-band waveform. Accordingly, the wearable device 101 may obtain noise-free inertial information.

Figure 6:
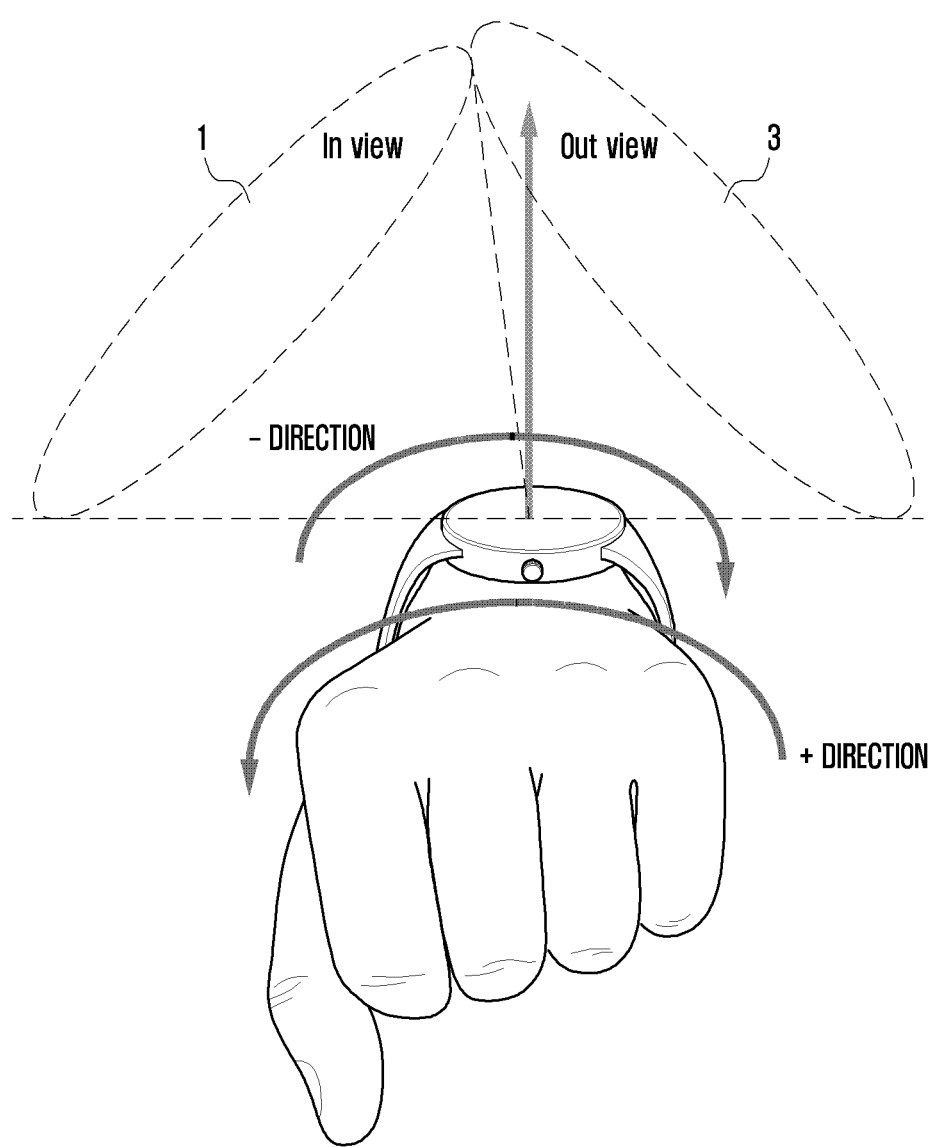
FIG. 6 illustrates a process of determining a direction of a wearable device according to an embodiment of the disclosure.

FIG. 6 illustrates a process of determining a direction of a wearable device according to an embodiment of the disclosure.

FIG. 6 shows a wearable device 101 of which a viewing angle changes according to movement of an arm on which the wearable device 101 is worn. The wearable device 101 may obtain inertial information by using a second sensor 1762, and may identify the viewing angle from the obtained inertial information. The wearable device 101 may include a configured value for a field-of-view range of a user. For example, the wearable device 101 may configure a viewing angle ranging from 10 degrees to 60 degrees as the field-of-view range of the user. The wearable device 101 may identify the viewing angle according to the movement of the arm on which the wearable device 101 is worn. For example, when the viewing angle is 30 degrees, the viewing angle may correspond to an inside of the configured field-of-view range of the user. Accordingly, the wearable device 101 may be determined to correspond to an inside of the field-of-view range of the user (1). The wearable device 101 may maintain an input determination threshold value at a first threshold value. When the viewing angle is-30 degrees, the viewing angle may correspond to an outside of the configured field-of-view range of the user. Accordingly, the wearable device 101 may be determined to correspond to an outside of the field-of-view range of the user (3). The wearable device 101 may change the input determination threshold value to a second threshold value.

Figure 7:
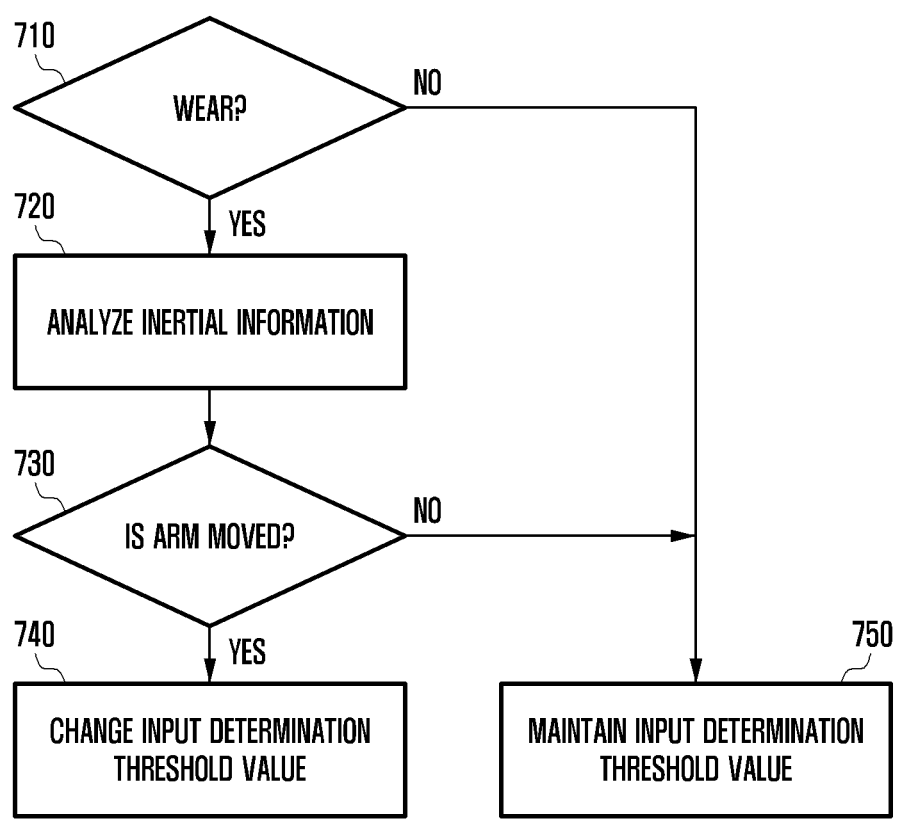
FIG. 7 is a flowchart illustrating a process of changing an input determination threshold value, based on a movement of a wearable device according to an embodiment of the disclosure.

FIG. 7 is a flowchart illustrating a process of changing an input determination threshold value, based on a movement of a wearable device according to an embodiment of the disclosure.

Figure 8:
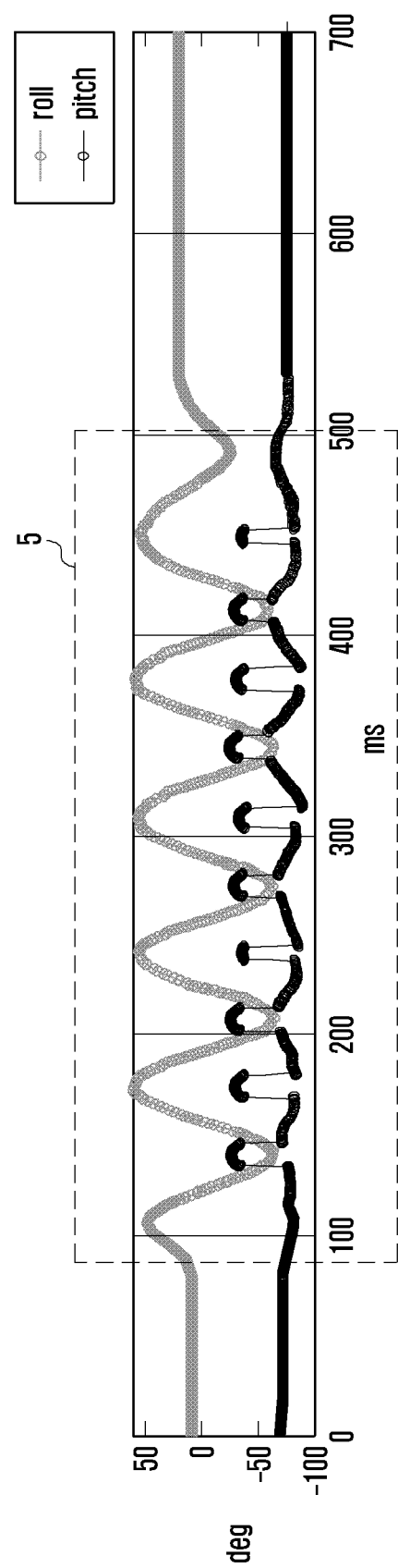
FIG. 8 illustrates movement data about a wearable device according to an embodiment of the disclosure.

FIG. 8 illustrates movement data about a wearable device according to an embodiment of the disclosure.

Referring to FIGS. 7 and 8, operations may be performed sequentially, but are not necessarily performed sequentially. For example, the operations may be performed in a different order, and at least two operations may be performed in parallel.

Operation 710 to operation 750 may be understood as being performed by a processor (e.g., the processor 120 of FIG. 2) of a wearable device (e.g., the wearable device 101 of FIG. 2).

Referring to FIG. 7, the wearable device 101 may determine whether the wearable device 101 is worn in operation 710. When the wearable device 101 determines that the wearable device 101 is not worn in operation 710-N, the wearable device 101 may maintain an input determination threshold value in operation 750. Accordingly, the wearable device 101 may maintain a first threshold value.

When the wearable device 101 determines that the wearable device 101 is worn operation 710-Y, the wearable device 101 may analyze inertial information operation 720. For example, the inertial information may include acceleration information, and the wearable device 101 may analyze the acceleration information, and may identify a viewing angle. Further, the wearable device 101 may determine change information about a roll value and/or pitch value. As illustrated in FIG. 8, when a user swings an arm according to a certain period, the roll value and/or pitch value may also change according to the certain period (5). The wearable device 101 may determine whether the arm moves, based on the change information about the roll value and/or pitch value in operation 730. When determining that the arm is moving in operation 730-Y, the wearable device 101 may change the input determination threshold value from the first threshold value to a second threshold value in operation 740. When determining that the arm is not moving (or is hardly moving) in operation 730-N, the wearable device 101 may maintain the input determination threshold value in operation 750.

The wearable device 101 may include various input interfaces. The wearable device 101 may determine a user input, based on the maintained input determination threshold value (e.g., the first threshold) or the changed input determination threshold value (e.g., the second threshold).

Figure 9A:
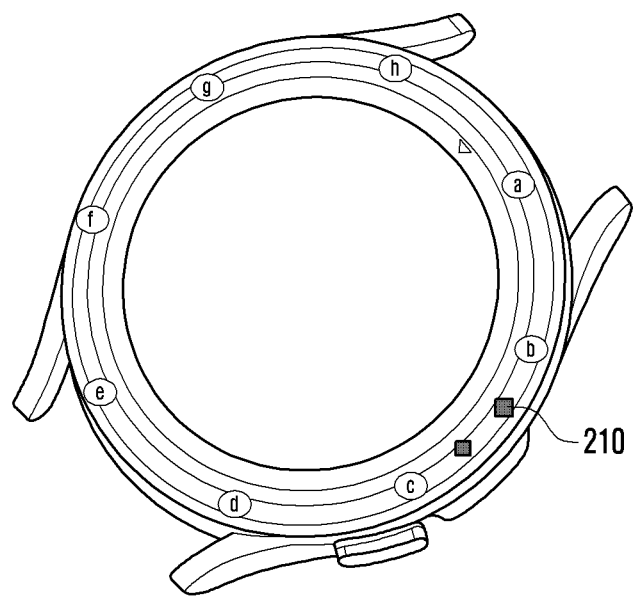
FIGS. 9A and 9B illustrate a bezel according to various embodiments of the disclosure.
Figure 9B:
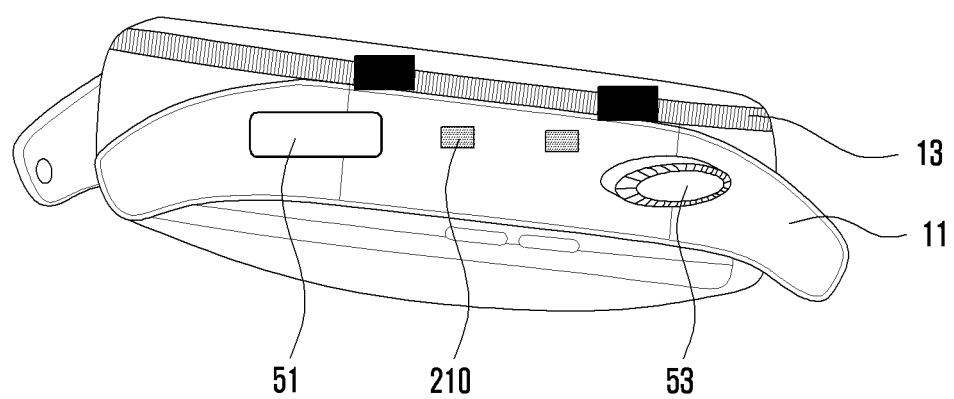

FIGS. 9A and 9B illustrate a bezel according to various embodiments of the disclosure.

Figure 10:
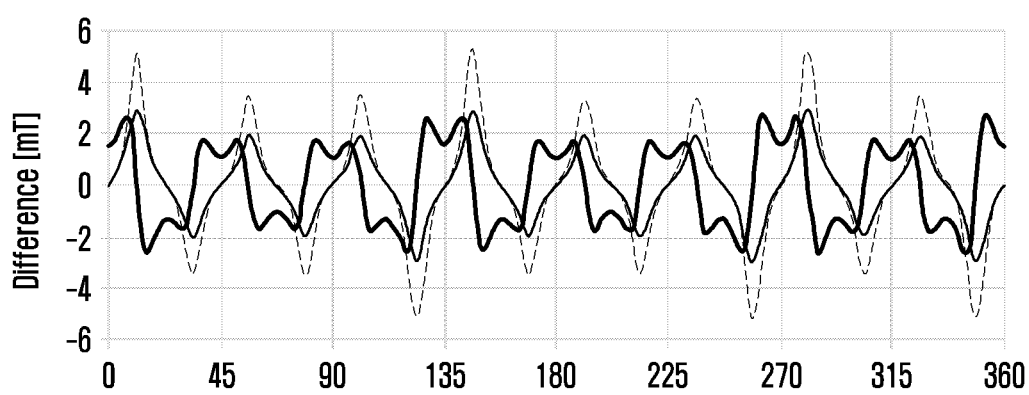
FIG. 10 illustrates a signal detected in a bezel according to an embodiment of the disclosure.

FIG. 10 illustrates a signal detected in the bezel according to an embodiment of the disclosure.

FIGS. 9A and 9B show a wearable device 101 including various input interfaces. For example, the wearable device 101 may include a rotatable bezel 13 on top of a main housing 11. The main housing 11 may include a magnetic sensor 210, and the bezel 13 may include one or more magnets a, b, c, d, e, f, g, and h at regular intervals. For example, the magnetic sensor 210 may include a Hall sensor and/or a magneto-resistive (MR) sensor.

As the bezel 13 rotates, the one or more magnets a, b, c, d, e, f, g, and h included in the bezel 13 may also rotate. As the one or more magnets a, b, c, d, e, f, g, and h rotate, a distance between the one or more magnets a, b, c, d, e, f, g, and h and the magnetic sensor 210 may increase or decrease. Magnetic field-related information (e.g., magnetic force and magnetic resistance) detected by the magnetic sensor 210 may increase or decrease as a distance between magnets increases or decreases.

FIG. 10 shows a change in magnetic force detected by the magnetic sensor for illustration. For example, when eight magnets are arranged at a uniform distance on the bezel 13, the plurality of magnets a, b, c, d, e, f, g, and h may be arranged at a 45-degree interval. When the magnets rotate according to rotation of the bezel 13, the magnetic field-related information detected by the magnetic sensor 210 may increase or decrease at the 45-degree interval. The wearable device 101 may determine magnetic field-related information of a certain value or greater as one input unit (or tick). For example, the certain value may be a value below a peak value of the magnetic field-related information near the peak value. Therefore, the wearable device 101 may determine each 45-degree rotation of the bezel 13 as one input unit. For example, when a first threshold value of the wearable device 101 is configured to 45 degrees (or one input unit), the wearable device 101 may determine each 45-degree rotation of the bezel 13 as one input unit.

The wearable device 101 may include a touchscreen, a buttons 51, a stem 53, and/or a jog dial. When an input interface 150 is the stem 53 and/or the jog dial, the wearable device 101 may configure an input determination threshold value as an angle. For example, a first threshold value of the stem 53 may be configured to 30 degrees, and the wearable device 101 may determine each 30-degree rotation of the stem 53 as one input. Alternatively, when the input interface 150 is the touchscreen and/or the button 51, the wearable device 101 may configure the input determination threshold value as a time, a pressure, and/or the number of times. For example, a first threshold value of the touchscreen and/or the button 51 may be configured to one second, and the wearable device 101 may determine pressing (or touching) the touchscreen and/or the button 51 one second or longer as one input. Alternatively, the first threshold value of the touchscreen and/or the button 51 may be configured to one time, and the wearable device 101 may determine pressing the touchscreen and/or button 51 one time as one input.

Figure 11:
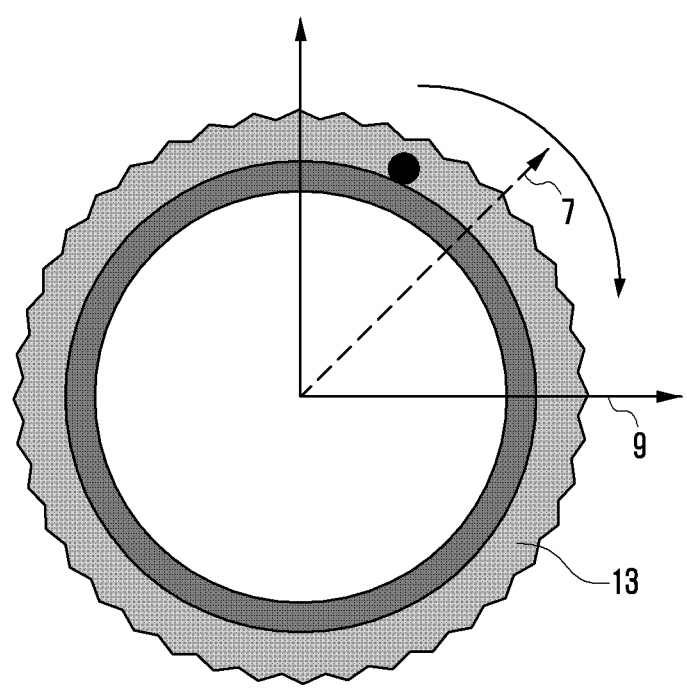
FIG. 11 illustrates a change of an input determination threshold value of a bezel according to an embodiment of the disclosure.

FIG. 11 illustrates a change of an input determination threshold value of a bezel according to an embodiment of the disclosure.

FIG. 11 shows a bezel 13 with an input determination threshold value changed. When determining that a display 160 corresponds to an outside of a field-of-view range of a user, a wearable device 101 may change an input determination threshold value from a first threshold value to a second threshold value. For example, the first threshold value 7 may be 45 degrees (or one input unit), and the second threshold value 9 may be 90 degrees (or two input units). Accordingly, when the input determination threshold value is changed from the first threshold value 7 to the second threshold value 9, the wearable device 101 may determine 90-degree rotation of the bezel 13 as one input. Alternatively, when an input interface 150 is a stem 51 and/or a jog dial, the wearable device 101 may change a first angle, which is the first threshold value 7, to a second angle, which is the second threshold value 9, in a similar manner. Accordingly, the wearable device 101 may determine rotation of the input interface 150 (e.g., the stem or the jog dial) by the second angle or greater as an input.

Figure 12A:
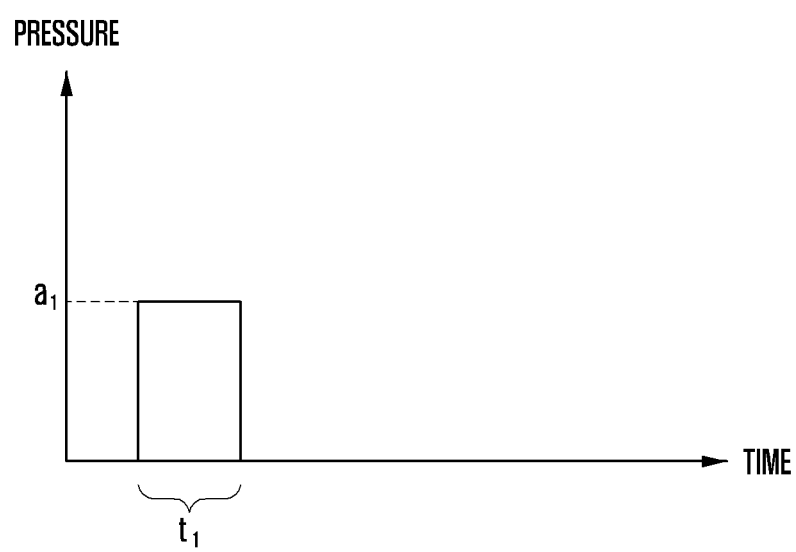
FIG. 12A illustrates an input determination threshold value of a button according to an embodiment of the disclosure.

FIG. 12A illustrates an input determination threshold value of a button according to an embodiment of the disclosure.

Figure 12B:
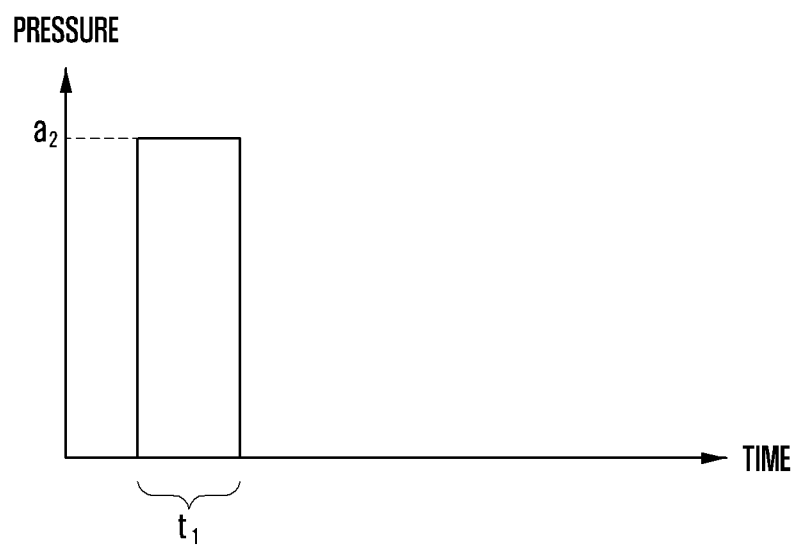
FIGS. 12B, 12C, and 12D illustrate a change of an input determination threshold value of a button according to various embodiments of the disclosure.
Figure 12C:
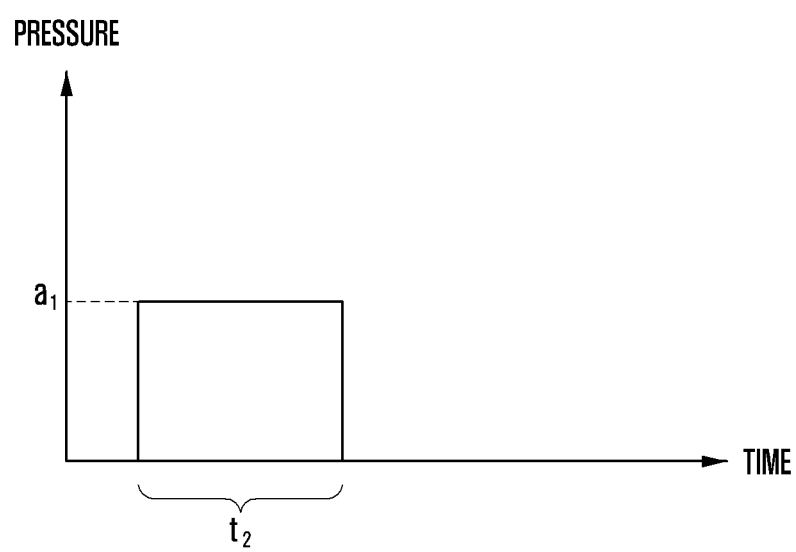
Figure 12D:
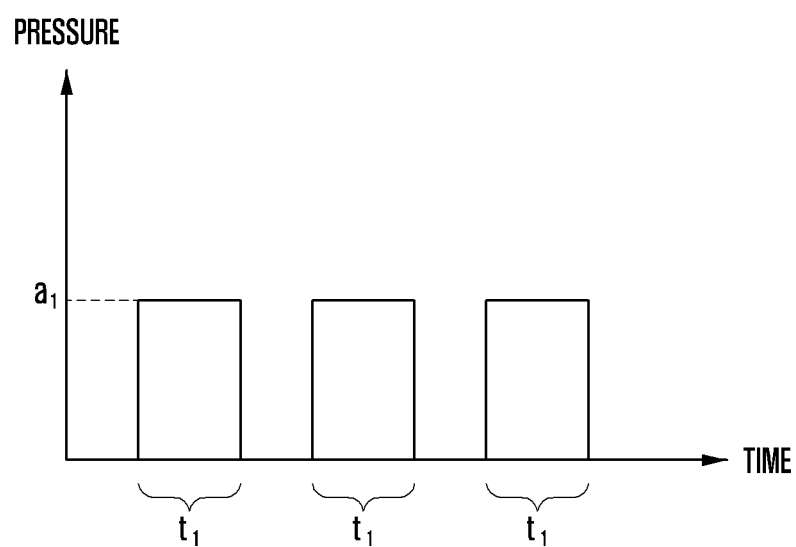

FIGS. 12B, 12C, and 12D illustrate a change of an input determination threshold value of a button according to various embodiments of the disclosure.

FIG. 12A shows an input determination threshold where an input interface 150 is a button 51 and/or a touchscreen. The input determination threshold value illustrated in FIG. 12A may be a first threshold. For example, the first threshold value may be configured to a pressure of a1, a time of t1, and/or the number of times of one time. Accordingly, the wearable device 101 may determine press of the input interface 150 by the configured first threshold value or greater as an input.

FIG. 12B shows a second threshold value where the input determination threshold value is a pressure according to an embodiment of the disclosure.

Referring to FIG. 12B, the first threshold value may be a1, and the second threshold value may be a2. When the input determination threshold value is changed to the second threshold value, the wearable device 101 may determine press of the input interface 150 (e.g., the button or the touchscreen) at the pressure of a2 or greater as an input.

FIG. 12C shows a second threshold value where the input determination threshold value is a time according to an embodiment of the disclosure.

Referring to FIG. 12C, the first threshold value may be t1, and the second threshold value may be t2. When the input determination threshold value is changed to the second threshold value, the wearable device 101 may determine press of the input interface 150 (e.g., the button or the touchscreen) for a time of t2 or longer as an input.

FIG. 12D shows a second threshold value where the input determination threshold value is the number of times according to an embodiment of the disclosure.

Referring to FIG. 12D, the first threshold value may be one time, and the second threshold value may be three times. When the input determination threshold value is changed to the second threshold value, the wearable device 101 may determine press of the input interface 150 (e.g., the button or the touchscreen) three times as an input.

The wearable device 101 may configure the input determination threshold value as a combination of a pressure, a time, and/or the number of times. For example, the wearable device 101 may configure the first threshold to a pressure of a1, a time of t1, and the number of times of on time, and may configure the second threshold to a pressure of a2, a time of t2, and the number of times of three times.

Figure 13A:
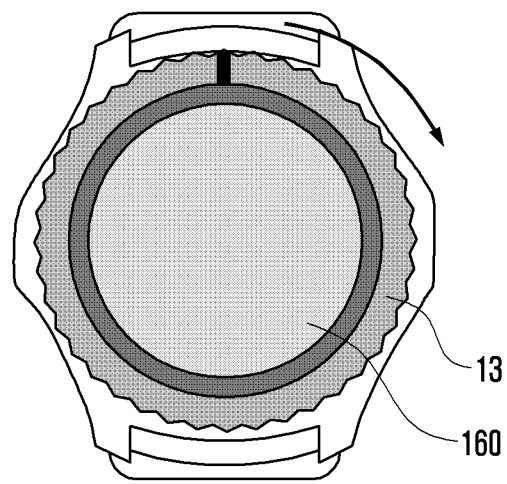
FIGS. 13A and 13B illustrate an operation of a wearable device according to various embodiments of the disclosure.
Figure 13A:
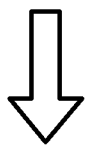
Figure 13A:
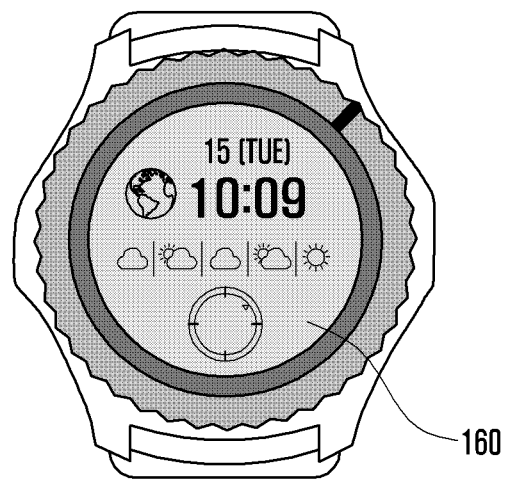
Figure 13B:
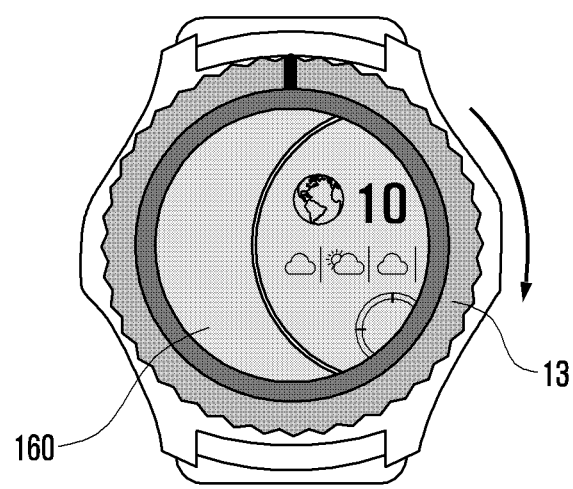

FIGS. 13A and 13B illustrate an operation of a wearable device according to various embodiments of the disclosure.

Referring to FIGS. 13A and 13B, when receiving an input of a configured input determination threshold value or greater, a wearable device 101 may perform a corresponding operation. For example, the corresponding operation may include changing a mode of a display and/or changing a screen. The mode of the display may include low-power mode a (e.g., a sleep mode), low-power mode b (e.g., an AOD mode), and a normal mode (e.g., wake-up mode).

Referring to FIG. 13A, the wearable device 101 may be in low-power mode a. For example, the input determination threshold value may be changed to a second threshold value, and the second threshold value may be 90 degrees. In this case, when a bezel 13 (or the stem 35 or jog dial) is rotated by 90 degrees, the wearable device 101 may change the mode of the display from low-power mode a to low-power mode b. Alternatively, the wearable device 101 may change the mode of the display from low-power mode b to the normal mode. When an input interface 150 is a button and/or a touchscreen and the button and/or the touchscreen is pressed by the second threshold value or greater, the wearable device 101 may change the mode of the display.

Referring to FIG. 13B, when the bezel 13 (or the stem 35 or jog dial) is rotated while an image (e.g., a UI) is displayed on the display 160, the wearable device 101 may change the image displayed on the display 160 to another image. For example, a first threshold value may be 30 degrees, and the second threshold may be 90 degrees. When a direction in which the display 160 faces corresponds to an inside of a field-of-view range of a user, the wearable device 101 may change the image in response to 30-degree rotation of the bezel. When the direction in which the display 160 faces corresponds to an outside of the field-of-view range of the user, the wearable device 101 may change the image in response to 90-degree rotation of the bezel. When the input interface 150 is a button and/or a touchscreen and the button and/or the touchscreen is pressed by the second threshold value or greater, the wearable device 101 may change a displayed screen.

Figure 14:
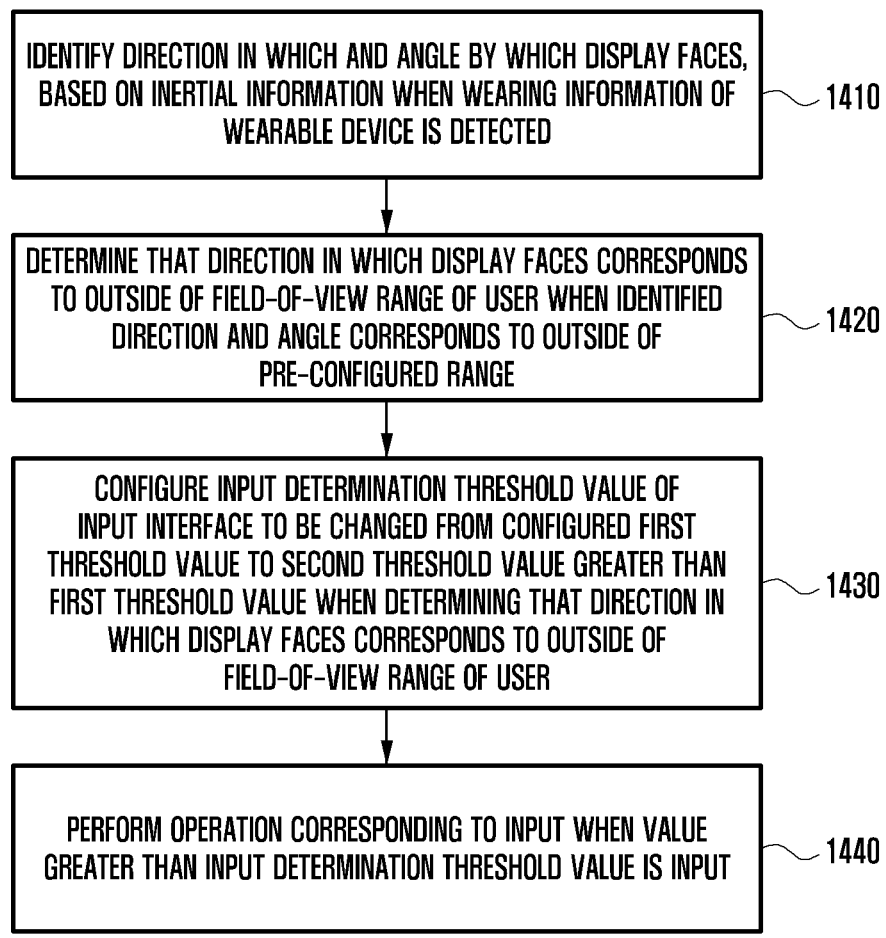
FIG. 14 is a flowchart illustrating a sensing information-based input control method according to an embodiment of the disclosure.

FIG. 14 is a flowchart illustrating a sensing information-based input control method according to an embodiment of the disclosure.

Referring to FIG. 14, operations may be performed sequentially, but are not necessarily performed sequentially.

For example, the operations may be performed in a different order, and at least two operations may be performed in parallel.

Operation 1410 to operation 1440 may be understood as being performed by a processor (e.g., the processor 120 of FIG. 2) of a wearable device (e.g., the wearable device 101 of FIG. 2).

Referring to FIG. 14, when detecting wearing information about the wearable device 101, the wearable device 101 may identify a direction in which and an angle by which the display 160 faces, based on inertial information in operation 1410. For example, the wearable device 101 may obtain the wearing information through a wearing detection sensor 1761. For example, the wearing detection sensor 1761 may include a photoplethysmogram (PPG) sensor, an electrocardiogram (ECG) sensor, an electrodermal activity sensor, and/or an $SpO_2$ sensor. Further, the wearable device 101 may obtain the inertial information through an inertial sensor 1762. For example, the inertial sensor 1762 may include an acceleration sensor, a gravity sensor, a gyro sensor, and/or a geomagnetic sensor. The inertial information may include acceleration information. Since the inertial information may include noise, the wearable device 101 may perform a preprocessing process of subjecting the inertial information to low-pass filtering.

The wearable device 101 may receive information related to a wearing position from a user. The wearable device 101 may determine an axis of the inertial sensor, based on the information related to the wearing position. For example, when the axis where the wearable device 101 is worn on the user's left arm is a first axis, the axis where the wearable device 101 is worn on the user's right arm may be an axis moved in an axisymmetric direction from the first axis.

The wearable device 101 may determine information about a vertical angle and size of the display 160 based on the axis of the inertial sensor and the inertial information, thereby identifying the direction in which and the angle by which the display 160 faces.

When the identified direction and angle escape from a pre-configured range, the wearable device 101 may determine that the direction in which the display 160 faces corresponds to an outside of a field-of-view range of the user In operation 1420. For example, when the pre-configured range is 10 degrees to 60 degrees and the identified direction and angle are −30 degrees, the wearable device 101 may determine that the direction of the display 160 corresponds to an outside of the field-of-view range of the user.

When determining that the direction of the display 160 corresponds to an outside of the field-of-view range of the user, the wearable device 101 may change an input determination threshold value of an input interface 150 from a first threshold value to a second threshold value in operation 1430. Further, when the vertical axis of the display 160 is horizontal and there is no movement (or almost no movement) of the wearable device 101, the processor 120 may determine that the user is in a state of lowering the arm on which the wearable device 101 is worn. Further, the wearable device 101 may identify change information about a roll value and/or pitch value of the wearable device 101 from the inertial information. When the identified change information about the roll value and/or pitch value is a pre-configured period or more, the wearable device 101 may determine that the user is swinging the arm on which the wearable device 101 is worn. The wearable device 101 may determine that the state of the user lowering the arm on which the wearable device 101 is worn or swinging the arm corresponds to an outside of the field-of-view range of the user.

When the input determination threshold value is changed to the second threshold value and the direction of the display 160 is determined to correspond to an outside of the field-of-view range of the user, even though a mode of the display 160 is changed, the wearable device 101 may maintain the input determination threshold value at the second threshold value.

When a value greater than the input determination threshold value is input, the wearable device 101 may perform an operation corresponding to an input in operation 1440. For example, the input interface 150 may include a bezel, a stem, and/or a jog dial. The input determination threshold value may be an angle, the first threshold value may be a pre-configured first angle, and the second threshold value may be a pre-configured second angle. When an angle input through the input interface 150 is greater than the configured input determination threshold value, the wearable device 101 may perform an operation corresponding to an input.

Alternatively, the input interface 150 may include a button and/or a touchscreen. The input determination threshold value may include an input time, an input pressure, and/or the number of inputs. The first threshold value may be a pre-configured first input time, a pre-configured first input pressure, and/or a pre-configured first number of inputs, and the second threshold value may include a pre-configured second input time, a pre-configured second input pressure, and/or a pre-configured second number of inputs. When an input time, an input pressure, and/or the number of inputs input through the input interface 150 are greater than the configured input determination threshold value, the wearable device 101 may perform an operation corresponding to an input. For example, the operation corresponding to the input may include changing the mode of the display 160 and/or changing a screen.

For example, a wearable device 101 may include an input interface 150, a first sensor 1761 configured to detect wearing information about the wearable device 101, a second sensor configured to detect inertial information about the wearable device 101, a display 160, and at least one processor 120. The at least one processor 120 may identify a direction in which and an angle by which the display 160 faces, based on the inertial information detected by the second sensor 1762 when the wearing information about the wearable device 101 is detected by the first sensor 1761. The at least one processor 120 may determine that the direction in which the display 160 faces corresponds to an outside of a field-of-view range of a user when the identified direction and angle escape from a pre-configured range. The at least one processor 120 may configure an input determination threshold value of the input interface 150 to be changed from a configured first threshold value to a second threshold value greater than the first threshold value when determining that the direction in which the display faces corresponds to an outside of the field-of-view range of the user. The at least one processor 120 may perform an operation corresponding to an input when a value greater than the input determination threshold value is input through the input interface 150.

For example, the at least one processor 120 may receive information related to a wearing position of the wearable device 101 through the input interface 150, and may determine an axis of the second sensor 1762, based on the information related to the received wearing position.

For example, the at least one processor 120 may be configured to identify the direction in which and the angle by which the display 160 faces by determining vertical angle and size information about the display 160 based on the determined axis of the second sensor 1762 and the inertial information.

For example, the at least one processor 120 may be configured to identify change information about a roll value and a pitch value of the wearable device 101, based on the detected inertial information. The at least one processor 120 may change the input determination threshold value of the input interface 150 from the first threshold value to the second threshold value when the identified change information about the roll value and pitch value is a pre-configured period or greater.

For example, the input interface 150 may include at least one of a bezel 13, a stem 53, and a jog dial. The first threshold may be a pre-configured first angle, and the second threshold value may be a pre-configured second angle. The at least one processor 120 may perform the operation corresponding to the input when an angle input through the input interface 150 is greater than the configured input determination threshold value.

For example, the wearable device 101 may further include a main housing 11 including a magnetic sensor 210. When the input interface 150 is the bezel 13, the bezel 13 may include a magnet a, b, c, d, e, f, g, and h, and may be disposed at a pre-configured interval and is disposed to rotate on top of the main housing. The magnetic sensor 210 may detect change information about a magnetic field, based on a distance to the magnet a, b, c, d, e, f, g, and h moving according to an input to rotate the bezel 13. The at least one processor 120 may identify the input angle, based on the change information about the magnetic field.

For example, the input interface 150 may include at least one of a button 51 and a touchscreen. The first threshold value may include at least one of a pre-configured first input time, a pre-configured first input pressure, and a pre-configured first number of inputs, and the second threshold value may include at least one of a pre-configured second input time, a pre-configured second input pressure, and a pre-configured second number of inputs. The at least one processor 120 may perform the operation corresponding to the input when at least one of an input time, an input pressure, and a number of inputs input through the input interface 150 is greater than the configured input determination threshold value.

For example, when the input determination threshold value is changed to the second threshold value and the direction in which the display 160 faces is determined to correspond to an outside of the field-of-view range of the user, the at least one processor 120 may maintain the input determination threshold value at the second threshold value even though a mode of the display 160 is changed.

For example, the at least one processor 120 may perform low-band pass filtering on the detected inertial information.

For example, a sensing information-based input control method of a wearable device 101 may include identifying a direction in which and an angle by which a display 160 faces, based on inertial information detected by a second sensor 1762 when wearing information about the wearable device 101 is detected by a first sensor 1761. The control method may include determining that the direction in which the display 160 faces corresponds to an outside of a field-of-view range of a user when the identified direction and angle escape from a pre-configured range. The control method may include configuring an input determination threshold value of an input interface 150 to be changed from a configured first threshold value to a second threshold value greater than the first threshold value when determining that the direction in which the display faces corresponds to an outside of the field-of-view range of the user. The control method may include performing an operation corresponding to an input when a value greater than the input determination threshold value is input.

The control method may include receiving information related to a wearing position of the wearable device 101. The control method may include determining an axis of the second sensor 1762, based on the information related to the received wearing position.

For example, the identifying of the direction in which and the angle by which the display 160 faces may include identifying the direction in which and the angle by which the display 160 faces by determining vertical angle and size information about the display 160 based on the determined axis of the second sensor 1762 and the inertial information.

For example, the control method may include identifying change information about a roll value and a pitch value of the wearable device 101, based on the detected inertial information. The control method may include changing the input determination threshold value of the input interface 150 from the first threshold value to the second threshold value when the identified change information about the roll value and pitch value is a pre-configured period or greater.

For example, the input interface 150 may include at least one of a bezel 13, a stem 53, and a jog dial. The first threshold value may be a pre-configured first angle, and the second threshold value may be a pre-configured second angle. The performing of the operation corresponding to the input may include performing the operation corresponding to the input when an angle input through the input interface 150 is greater than the configured input determination threshold value.

For example, the performing of the operation corresponding to the input may include detecting change information about a magnetic field, based on a distance to a magnet a, b, c, d, e, f, g, and h moving according to an input to rotate the bezel 13. The performing of the operation corresponding to the input may include identifying the input angle, based on the change information about the magnetic field.

For example, the input interface 150 may include at least one of a button 51 and a touchscreen. The first threshold value may include at least one of a pre-configured first input time, a pre-configured first input pressure, and a pre-configured first number of inputs, and the second threshold value may include at least one of a pre-configured second input time, a pre-configured second input pressure, and a pre-configured second number of inputs. The performing of the operation corresponding to the input may include performing the operation corresponding to the input when at least one of an input time, an input pressure, and a number of inputs input through the input interface 150 is greater than the configured input determination threshold value.

For example, the control method may include maintaining the input determination threshold value at the second threshold value even though a mode of the display 160 is changed when the input determination threshold value is changed to the second threshold value and the direction in which the display 160 faces is determined to correspond to an outside of the field-of-view range of the user.

For example, the control method may further include performing low-band pass filtering on the detected inertial information.

For example, a non-transitory computer-readable recording medium recording a program to perform a sensing information-based input control method of a wearable device 101 may perform an operation of identifying a direction in which and an angle by which a display 160 faces, based on inertial information detected by a second sensor 1762 when wearing information about the wearable device 101 is detected by a first sensor 1761. The non-transitory computer-readable recording medium may perform an operation of determining that the direction in which the display 160 faces corresponds to an outside of a field-of-view range of a user when the identified direction and angle escape from a pre-configured range. The non-transitory computer-readable recording medium may perform an operation of configuring an input determination threshold value of an input interface 150 to be changed from a configured first threshold value to a second threshold value greater than the first threshold value when determining that the direction in which the display 160 faces corresponds to an outside of the field-of-view range of the user. The non-transitory computer-readable recording medium may perform an operation of performing an operation corresponding to an input when a value greater than the input determination threshold value is input.

For example, the non-transitory computer-readable recording medium may perform an operation of identifying change information about a roll value and a pitch value of the wearable device 101, based on the detected inertial information. The non-transitory computer-readable recording medium may perform an operation of changing the input determination threshold value of the input interface 150 from the first threshold value to the second threshold value when the identified change information about the roll value and pitch value is a pre-configured period or greater.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
   an input interface;
   a first sensor detecting wearing information about the wearable device;
   a second sensor detecting inertial information about the wearable device;
   a display;
   memory storing one or more computer programs; and
   one or more processors communicatively coupled to the input interface, the first sensor, the second sensor, the display, and the memory,
   wherein the one or more computer programs include computer-readable instructions that, when executed by the one or more processors individually or collectively, cause the wearable device to:
      identify change information about a roll value and a pitch value of the wearable device, based on the inertial information detected by the second sensor in case that the wearing information about the wearable device is detected by the first sensor,
      identify a direction in which the display faces. based on the identified change information about the roll value and the pitch value of the wearable device,
      determine that the direction in which the display faces corresponds to an outside of a field-of-view range of a user in case that an arm of the user on which the wearable device is disposed swings for a predetermined period or greater, which is determined based on a changing period of the identified change information about the roll value and pitch value is being the predetermined period or greater,
      change an input determination threshold value of the input interface from a first threshold value to a second threshold value greater than the first threshold value in case of determining that the direction in which the display faces corresponds to the outside of the field-of-view range of the user, and
      perform an operation corresponding to an input in case that a value greater than the input determination threshold value is input through the input interface.

2. The wearable device of claim 1, wherein the one or more computer programs further include computer-executable instructions that, when executed by the one or more processors individually or collectively, cause the wearable device to receive information related to a wearing position of the wearable device through the input interface, and determine an axis of the second sensor, based on the information related to the received wearing position.

3. The wearable device of claim 2, wherein the one or more computer programs further include computer-executable instructions that, when executed by the one or more processors individually or collectively, cause the wearable device to: identify the direction in which the display faces by determining vertical angle and size information about the display based on the determined axis of the second sensor and the inertial information.

4. The wearable device of claim 1,
   wherein the input interface comprises at least one of a bezel, a stem, or a jog dial,
   wherein the first threshold value is a predetermined first angle, and the second threshold value is a predetermined second angle, and
   wherein the one or more computer programs further include computer-executable instructions that, when executed by the one or more processors individually or collectively, cause the wearable device to: perform the operation corresponding to the input in case that an angle input through the input interface is greater than the input determination threshold value.

5. The wearable device of claim 4, further comprising:
   a main housing including a magnetic sensor,
   wherein, in case that the input interface is the bezel, the bezel comprises a magnet disposed at a predetermined interval and is disposed to rotate on top of the main housing,
   wherein the magnetic sensor detects change information about a magnetic field, based on a distance to the magnet moving according to an input to rotate the bezel, and
   wherein the one or more computer programs further include computer-executable instructions that, when executed by the one or more processors individually or collectively, cause the wearable device to: identify the input angle, based on the change information about the magnetic field.

6. The wearable device of claim 1,
   wherein the input interface comprises at least one of a button and a touchscreen,
   wherein the first threshold value comprises at least one of a predetermined first input time, a predetermined first input pressure, and a predetermined first number of inputs, and the second threshold value comprises at least one of a predetermined second input time, a predetermined second input pressure, and a predetermined second number of inputs, and
   wherein the one or more computer programs further include computer-executable instructions that, when executed by the one or more processors individually or collectively, cause the wearable device to: perform the operation corresponding to the input in case that at least one of an input time, an input pressure, and a number of inputs input through the input interface is greater than the input determination threshold value.

7. The wearable device of claim 1, wherein one or more computer programs further include computer-executable instructions that, when executed by the one or more processors individually or collectively, cause the wearable device to: in case that the input determination threshold value is changed to the second threshold value and the direction in which the display faces is determined to correspond to the outside of the field-of-view range of the user, maintain the input determination threshold value at the second threshold value even though a mode of the display is changed.

8. The wearable device of claim 1, wherein the one or more computer programs further include computer-executable instructions that, when executed by the one or more processors individually or collectively, cause the wearable device to: perform low-band pass filtering on the detected inertial information.

9. A sensing information-based input control method performed by a wearable device, the method comprising:
identifying change information about a roll value and a pitch value of the wearable device, based on inertial information detected by a second sensor of the wearable device in case that wearing information about the wearable device is detected by a first sensor of the wearable device;
identifying a direction in which a display of the wearable device faces, based on the identified change information about the roll value and the pitch value of the wearable device;
determining that the direction in which the display faces corresponds to an outside of a field-of-view range of a user in case that an arm of the user on which the wearable device is disposed swings for a predetermined period or greater, which is determined based on a changing period of the identified change information about the roll value and pitch value is being the predetermined period or greater;
changing an input determination threshold value of an input interface of the wearable device from a first threshold value to a second threshold value greater than the first threshold value in case of determining that the direction in which the display faces corresponds to the outside of the field-of-view range of the user; and
performing an operation corresponding to an input in case that a value greater than the input determination threshold value is input.

10. The method of claim 9, further comprising: receiving information related to a wearing position of the wearable device and determining an axis of the second sensor, based on the information related to the received wearing position.

11. The method of claim 10, wherein the identifying of the direction in which the display faces comprise identifying the direction in which the display faces by determining vertical angle and size information about the display based on the determined axis of the second sensor and the inertial information.

12. The method of claim 9,
wherein the input interface comprises at least one of a bezel, a stem, or a jog dial,
wherein the first threshold value is a predetermined first angle, and the second threshold value is a predetermined second angle, and
wherein the performing of the operation corresponding to the input comprises performing the operation corresponding to the input in case that an angle input through the input interface is greater than the input determination threshold value.

13. The method of claim 12, wherein the input angle is identified based on a change in a magnetic field detected by a magnetic sensor of the wearable device.

14. The method of claim 10,
wherein the input interface comprises at least one of a button and a touchscreen,
wherein the first threshold value comprises at least one of a predetermined first input time, a predetermined first input pressure, and a predetermined first number of inputs, and the second threshold value comprises at least one of a predetermined second input time, a predetermined second input pressure, and a predetermined second number of inputs, and
wherein the performing of the operation corresponding to the input comprises performing the operation corresponding to the input in case that at least one of an input time, an input pressure, and a number of inputs input through the input interface is greater than the configured input determination threshold value.

15. The method of claim 9, further comprising: in case that the input determination threshold value is changed to the second threshold value and the direction in which the display faces is determined to correspond to the outside of the field-of-view range of the user, maintaining the input determination threshold value at the second threshold value even though a mode of the display is changed.

16. The method of claim 9, further comprising performing low-band pass filtering on the detected inertial information.

17. One or more non-transitory computer-readable recording media storing one or more computer programs including computer-executable instructions that, when executed by one or more processors of a wearable device individually or collectively, cause the wearable device to perform operations, the operations comprising:
identifying change information about a roll value and a pitch value of the wearable device, based on inertial information detected by a second sensor of the wearable device in case that wearing information about the wearable device is detected by a first sensor of the wearable device;
identifying a direction in which a display of the wearable device faces, based on the identified change information about the roll value and the pitch value of the wearable device;
determining that the direction in which the display faces corresponds to an outside of a field-of-view range of a user in case an arm of the user on which the wearable device is disposed swings for a predetermined period or greater, which is determined based on a changing period of the identified change information about the roll value and pitch value is being the predetermined period or greater;
changing an input determination threshold value of an input interface of the wearable device from a first threshold value to a second threshold value greater than the first threshold value in case of determining that the direction in which the display faces corresponds to the outside of the field-of-view range of the user; and
performing an operation corresponding to an input in case that a value greater than the input determination threshold value is input.

18. The non-transitory computer readable storage media of claim 17, wherein the changing of the input determination threshold value comprises:
changing the input determination threshold value from the first threshold value to the second threshold value in response to a determination that a body part on which the wearable device is worn is moving.

* * * * *